(12) United States Patent
Maget et al.

(10) Patent No.: US 6,171,368 B1
(45) Date of Patent: Jan. 9, 2001

(54) GAS EXTRACTION FROM CLOSED CONTAINERS

(75) Inventors: Henri J. R. Maget, La Jolla; Robert J. Rosati, Carlsbad, both of CA (US)

(73) Assignee: Med-E-Cell, San Diego, CA (US)

( * ) Notice: Under 35 U.S.C. 154(b), the term of this patent shall be extended for 0 days.

(21) Appl. No.: 09/187,615

(22) Filed: Nov. 6, 1998

(51) Int. Cl.$^7$ .................................................. B01D 53/22
(52) U.S. Cl. .................................. 95/54; 95/254; 95/263; 95/266; 96/4; 96/6; 96/11; 96/30; 96/52; 96/156; 96/174; 96/181; 96/193; 96/197; 96/202; 96/220; 204/258; 204/265; 204/266; 204/271; 55/309; 55/421; 429/7; 429/53; 429/59
(58) Field of Search .............................. 95/54, 254, 263, 95/266; 96/4, 6, 11, 30, 52, 156, 174, 181, 193, 197, 202, 220; 55/309, 421; 204/258, 265, 266, 271; 429/7, 53, 59

(56) References Cited

U.S. PATENT DOCUMENTS

| | | |
|---|---|---|
| 3,415,310 | 12/1968 | Kuhlmann . |
| 3,437,428 | 4/1969 | Quesada et al. . |
| 3,598,518 | 8/1971 | Goto . |
| 3,937,847 | 2/1976 | Elkins et al. . |
| 4,817,391 | 4/1989 | Roe et al. . |
| 4,902,278 * | 2/1990 | Maget et al. .......................... 204/265 |
| 5,038,821 | 8/1991 | Maget . |
| 5,149,413 | 9/1992 | Maget . |

\* cited by examiner

*Primary Examiner*—Bruce F. Bell
(74) *Attorney, Agent, or Firm*—Brown Martin Haller & McClain LLP

(57) ABSTRACT

Apparatus and an associated method of operation are disclosed for removal of gaseous contaminants, particularly oxygen, from closed containers. The apparatus is economical, simple to install and operate, of convenient size, and highly effective. A gas extractor communicates with a container for a gas-sensitive product. A high gas concentration in the container causes operation of the extractor until the gas concentration is reduced to a desired low level, when the extractor operation stops. Separate sensors and controllers responsive to concentrations can be present, or the extractor can be self-actuated by use as a power source of a battery which operates on gas generated by operation of the extractor. The system preferably is used for oxygen extraction from containers holding oxygen-sensitive contents. The preferred extractor includes an electrochemical cell which has a ion-permeable membrane disposed between two electrodes. Reduction of the oxygen occurs at the cathode of the cell and oxidation of an oxygen-containing species occurs at the anode of the cell, thus having the effect of removing the oxygen from the container. Use of a metal-air battery to power the cell allows the generated oxygen to be used within the system such that the extraction unit can be entirely enclosed and self-contained, as well having its operation self-initiated and self-limiting. Gases other than oxygen, particularly hydrogen and the halogen gases, can also be extracted from containers, and self-limiting systems other than for oxygen are included, using battery types appropriate to the gas being extracted.

60 Claims, 5 Drawing Sheets

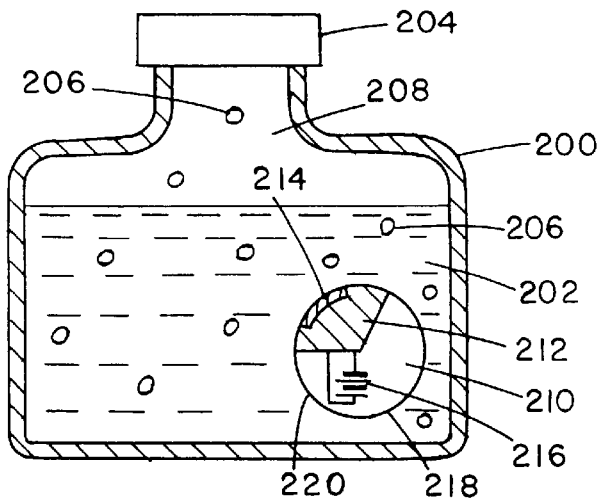
FIG. 13A
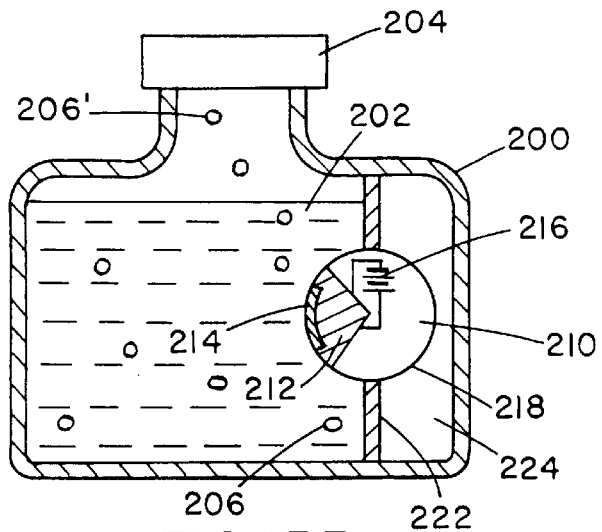
FIG. 13B
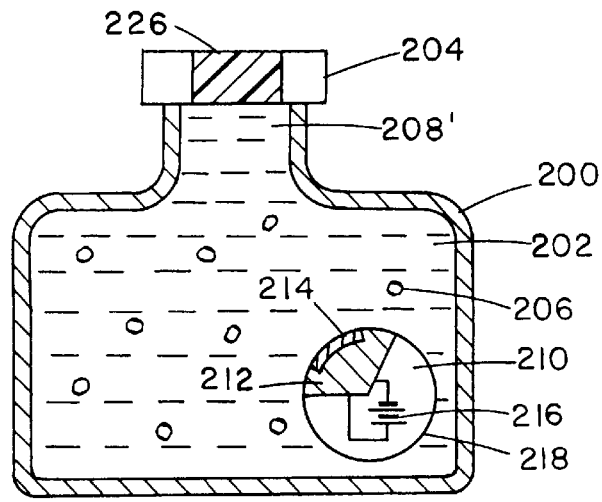
FIG. 13C
FIG. 13

GAS EXTRACTION FROM CLOSED CONTAINERS

CROSS-REFERENCE TO RELATED DOCUMENT

Documents describing the present invention have been filed with the U.S. Patent and Trademark Office under the Disclosure Document Program on May 11, 1998, and have been assigned the Disclosure number 436236.

BACKGROUND OF THE INVENTION

1. Field of Invention

The present invention relates to the removal of contaminating gases, such as oxygen, from containers. The present invention is particularly related to the removal of oxygen from containers for oxygen-sensitive products such as pharmaceuticals, biocompounds, chemicals, blood products, foods and beverages.

2. Description of the Background

Oxygen is a principal component of air and as such is of course pervasive in all locations exposed to the ambient atmosphere. Further, many materials are permeable in varying degrees to oxygen, so that containers made of such permeable materials cannot protect their contents from exposure to oxygen from the surrounding environment over prolonged periods of time. In many cases it is impractical or uneconomical to store oxygen-sensitive contents in containers made of oxygen-impermeable materials, so one must seek means for eliminating oxygen from permeable containers initially and then removing such oxygen as subsequently enters into the containers by permeation through the container walls before the oxygen can degrade the oxygen-sensitive contents. Unfortunately prior art means for oxygen scavenging have been impractical for many applications or have been of minimal effectiveness.

The oxygen sensitivity of pharmaceuticals and various biocompounds represents an issue of continued concern to drug manufacturers and others in the health care industry. Certain families of organic compounds commonly used for medicinal purposes are sensitive to oxygen and the resulting oxidation of these compounds contributes to the reduction of their usefulness. For example, the presence of oxygen in solutions of epinephrine result in a change from a colorless solution to a pink and eventually a brown colored solution or precipitate. Medical references advise that discolored solutions of epinephrine, as well as other medicinal compounds that undergo a color change with prolonged exposure to oxygen, should not be used for medical treatment. Further, prolonged exposure to oxygen can increase the photosensitivity of a drug. The antibiotics tetracycline and doxycycline undergo degradation when exposed to oxygen resulting in a drug that is potentially photo-toxic.

Medications are not the only products having sensitivity to oxygen. Blood and blood products, such as plasma, are particularly susceptible to oxidation by atmospheric oxygen, rendering them unusable. A simple method for the de-oxygenation of blood and blood products could prolong their storage life making blood bank and hospital supplies easier to maintain. Cosmetics formulated for topical application are prone to bacterial growth, aided by a rich oxygen environment. A storage means that limits the oxygen available to come in contact with the cosmetic formulation would not only increase the shelf life of the product but make it more hygienic for the user as well. Further, chemical additives currently used to prolong the storage life of cosmetics could be eliminated provided an alternate source for preservation of the formulation. Common food staples such as coffee, powdered milk, sugar, nuts, etc. are susceptible to spoilage when left exposed to the oxygen and moisture of the surrounding environment. An inexpensively manufactured, easily facilitated low oxygen-permeable plastic container could keep food staples stored, under vacuum, relatively free of oxygen to prevent spoilage and prolong shelf life.

Processed metals, such as comminuted metals that auto-ignite in air, and active catalysts like platinum on carbon carriers which need to be maintained in a reducing atmosphere, could benefit from a simple, low-cost means to remove oxygen from the containers they are held in. Many electric and electronic components are also susceptible to metal oxidation during their shipment and storage. This oxygen sensitivity is compounded by the fact that a vast majority of electronic devices are manufactured overseas and shipped to their destination via ocean going vessel, where exposure to sea air amplifies the potential for oxidation. The availability of oxygen free packaging would eliminate much of this destructive oxidation.

Current methods are available for the removal of oxygen from containers used for pharmaceuticals and other biologics during packaging however, most are cumbersome and costly and do nothing to maintain an oxygen-free environment over an extended period of time. One such process removes oxygen from the vial headspace over an oxygen-sensitive drug by flooding the environment with nitrogen or argon gas. Industrial filling equipment is available and capable of filing 20–30 vials per minute, leaving an oxygen level of slightly less than 1%. However, such equipment represents a large capital expenditure for the user which may make this method for oxygen removal less cost effective than some other means. In addition, this equipment does not provide for the elimination of oxygen that diffuses into the container during prolonged storage periods.

The addition of chemical preservatives that scavenge oxygen represents another method used to eliminate oxygen from medicinals and cosmetics. Antioxidants such as sodium bisulfite, sodium thiosulfates, phenol derivatives, methionine and, in the case of cosmetic formulations, hydroxyphenylglycerine are added to scavenge oxygen from the proximity of the oxygen-sensitive compound. However, these chemicals have a limited functional life and only scavenge oxygen at rates relative to their concentration, which diminishes over time. Further, because these chemical additives are actually an ingredient of the medicinal formulation, they are injected into the body along with the desired drug and may render the drug less effective, or worse, provoke additional health problems.

Current strategies for the elimination of oxygen from medicinal, cosmetic and electronics packaging are often cumbersome, costly, or potentially harmful. The need remains for a simple, cost effective method for the removal of oxygen from various kinds of packaging to enhance the storage life of oxygen-sensitive drugs, blood, blood products and substitutes, cosmetics, foods and beverages, electronic devices, and oxygen-sensitive metals.

Electrochemical oxygen separation systems, based on polymer electrolytes (ionomers) have been previously described by Maget, U.S. Pat. No. 5 3,489,670 and by Fujita et al., U.S. Pat. No. 4,539,086 and again by Fujita et al. in the publication, *Journal of Applied Electrochemistry*, 16 (1986), pp 935–940. The specific concept of combining small batteries with an electrochemical cell module has been described by Maget et al., U.S. Pat. No. 4,902,278. Maget, U.S. Pat. No. 4,902,278 also describes the use of a zinc-air battery as a power source.

While oxygen contamination as described above is a principal problem in many areas, other gaseous contaminants such as hydrogen and halogen gases are also candidates for elimination by electrochemical extraction.

Further, while in many cases the gaseous materials are present as deleterious contaminants, non-deleterious gaseous materials may be present in closed containers and be candidates for extraction because they are valuable materials in their own right or for other reasons.

SUMMARY OF THE INVENTION

We have now invented apparatus and its associated method of operation for removal of gaseous materials, particularly oxygen, hydrogen and halogen gases, from closed containers. The apparatus is economical, simple to install and operate, of convenient size, and highly effective.

For the purposes of this invention, the relationship between the container contents and the extractable gas present within the container is not critical. In many cases the motivation to extract the gas is that the contents of the container are subject to degradation in the presence of the gas or that the gas causes some degree of reaction between different constituents of the contents. However, a gas may be inert toward the contents, but there may still be motivation for its extraction from the container. For instance, the gas may itself be a valuable commodity. Alternatively, it may be inert to the contents in the container but be deleterious to the contents or other substances or objects if carried out of the container as absorbed on or contained within the removed contents, as for instance a gas which induces foaming in or expansion of the removed contents or materials into which the contents are incorporated. Similarly, the manner in which the gas becomes present within the container is not critical. In many cases, especially with oxygen from the ambient atmosphere, the gas enters the container when the container is opened to insert the contents or by infiltration through the container's walls. In other cases, the gases are evolved from absorption within the container's contents, or are formed by reaction between components of the contents. In yet other cases, the gases may form by boiling or sublimation if the container contents reach a temperature above the content material's boiling or sublimation point.

Therefore, for brevity and the purposes of the description herein, the gas to be extracted will simply be identified as a "contaminant" in the container in the sense that its removal from within the container is desirable. It is to be understood, however, that the term "contaminant" does not necessarily imply that the gas's presence within the container is deleterious to the container or its contents. Those skilled in the art reading this description will have no difficulty determining when the "contaminant" gas is also "deleterious" from the context.

Specifically, in our invention, we provide a container for a product, in which container a contaminant gas is or will become present, and a gas extractor which is in fluid communication with the interior of the container for removing the gas from the container. There are also present initiator means to start the operation of the gas extractor and begin extraction of the contaminant gas from the container, and cessation means, to stop the operation of the gas extractor and halt the extraction of the contaminant gas. Preferably, as will be described below, the initiator means and the cessation means are part of the electrochemical structure and function of the gas extractor itself, and no additional separate components of the system are required. However, the invention also contemplates that the initiator means and/or cessation means may be physically separate components of the system, operably connected to the gas extractor.

The invention functions by removing contaminant gas from the container when the concentration of the gas within the container is at any level which is considered to be unacceptable for any reason, whether because of significant degradation of the container contents over a period of time, or because the amount of the gas within the container is commercially valuable, or otherwise. The initiating concentration may vary widely depending on the specific gas and its commercial value or its potential for degradation, or other factors which will be evident to those skilled in the art. Once the gas concentration is lowered to a second, lower level of concentration, the cessation means halts operation of the extractor. This lower concentration will be determined by consideration of the lowest level of concentration which can be obtained by the extractor within a reasonable period of time and at a reasonable expenditure of energy. It is known that removal of contaminating gas from within a container becomes progressively more difficult as the concentration of the gas diminishes, such that at low concentrations incremental removal of additional gas becomes uneconomical and/or impractical. As with the first, upper limit, determination of the second, lower limit may include consideration of the nature of the gas, its degradation potential, its commercial value, etc. The values of the optimum upper and/or lower levels will vary for each different gas, container and container contents, and even for the two instances of the same gas, container and contents two users of the invention may differ on the specific values to be considered optimum. However, each user skilled in the art will readily be able to determine what he or she considers to be the optimum operation of the present invention in any given situation.

It is possible to separate either or both the initiator means and the cessation means physically from the gas extractor. For instance, a gas concentration sensor may continually monitor the concentration of gas within the container and be operably connected to a controller for the power source for the extractor. When the controller detects a signal from the sensor indicating the presence of the first, high concentration of the contaminant gas within the container, the controller in response to that signal acts as the initiator means and starts the power source from the extractor. Thereafter the extractor continues to run, eliminating contaminating gas within the container and collecting it in an extracted gas chamber, thus lowering the concentration of the contaminating gas within the container. When the gas concentration within the container has been lowered to the desired or predetermined second, lower level, and the controller detects a signal from the sensor to that effect, the controller in response to that signal acts as the cessation means and stops the power source for the extractor, halting further removal of contaminating gas. Subsequent increase in concentration level of the contaminant gas within the container, as by permeation through the container wall, will eventually again reach the first, high level which causes the controller to initiate operation of the extractor, and the operating cycle is repeated.

It is much preferred, however, for the upper and lower limits to be self-determined by the electrochemistry of the apparatus and its method of operation, such that the "sensor" and "controller" mentioned above are in fact self-contained electrochemical functions within the structure of the apparatus. Thus in the preferred embodiments, those "components" do not represent separate devices but rather are inherent functions of the apparatus itself.

Two factors are important in the present invention. The first is the extractor, which in a preferred embodiment includes an electrochemical cell which has a ion-permeable membrane disposed between two electrodes. During operation reduction or oxidation of the gaseous contaminant occurs on the container side of the cell (i.e., the side in fluid communication with the interior of the container) inducing transport of an ionic species across the membrane and regenerating equivalent gaseous material by the opposite oxidation or reduction reaction at the other side of the membrane, thus having the effect of removing the contaminant gas from the container and reconstituting it on the opposite (exterior) side of the cell, such that the concentration of the gas is lowered within the container. It will be noted that which side of the cell oxidation or reduction takes place on, will be determined by the chemistry of the contaminant gas.

The second is the handling of the regenerated gas. While in some cases the gas may be simply discharged or dispersed to the ambient atmosphere, in a preferred embodiment the gas is collected in the extractor and is used in part to power the extractor. This results in no net evolution of gas out of the container/extractor system, so that the extractor can, for instance, be positioned within the container itself, and even within the contents of the container (for instance, within a fluid body if that fluid is the contents of the container). The exemplified oxygen extraction system is particularly capable of this type of operation, by selecting a metal-air battery as the power source for the electrochemical cell. The extracted oxygen can be routed to and used as the "air" source for the cell battery.

It is the latter concept which results in a cell and extractor system (electrochemical module or "ECM") which is self-limiting and controlling. When the oxygen concentration in a container is high, oxygen will be generated at oxidation surface of the membrane and will migrate to the metal-air battery where it will cause the battery to continue to produce electricity, which will continue the reduction of the oxygen on the container side of the membrane and reduction of the oxygen concentration within the container. As the oxygen concentration is reduced, however, it ultimately reaches a level where insufficient reduction/oxidation electron transfer is occurring across the membrane to sustain a sufficient level of oxygen generation on the oxidation surface of the membrane to run the metal-air battery, so that the battery will stop operating. As the oxygen concentration again rises within the container, an oxygen concentration level will eventually be reached at which some oxygen will diffuse through the membrane and restart the metal-air battery, which in turn will then operate the reduction/oxidation electrochemical process until the oxygen concentration within the container again drops to a level too low to sustain operation of the battery.

In the discussion below, the apparatus and method will be exemplified by reference to removal of oxygen from a container having oxygen-sensitive contents. It will of course be understood that the invention is not limited merely to removal or extraction of an oxygen contaminant, but will be equally applicable to extraction of many gases from closed containers. Of particular interest in addition to oxygen are hydrogen and the various halogen gases, especially chlorine and bromine. It is also not necessary that a gas to be extracted must have a contaminating or degrading effect on the contents of the container. For instance, the gas to be removed may be evolved from the container contents to be recovered as a separate valuable product. Similarly, removal of evolved or infiltrated gas may be desirable to maintain a specific gas pressure level within the container, the gas to be removed may evolve as a by-product of a chemical reaction taking place within the contents of the container, or the extraction of the gas may be desirable to cause or prevent a chemical reaction within the container. (Examples of the last would be a) a reaction A+C→AC, where removal of C would prevent formation of AC, or b) a reaction AC→A+C, where removal of C would induce the decomposition of AC.)

Therefore, in a broad embodiment, the invention is of an apparatus for removing gaseous material from within an enclosed space, which comprises a container having an enclosed interior comprising the space and containing the gaseous material; an extractor in fluid contact with the interior of the container for extracting at least a portion the gaseous material from the interior of the container and collecting or dispersing the portion of the gaseous material exteriorly of the interior of the container; and the extractor further comprising initiating means responsive to a first concentration of the gaseous material in the container for initiation of operation of the extractor to extract the portion of the gaseous material and cessation means responsive to a second concentration, less than the first concentration, of the gaseous material in the container for ceasing operation of the extractor; such that operation of the extractor causes removal of that quantity of the gaseous material from the interior of the container which reduces concentration of the gaseous material in the interior of the container from the first concentration to the second concentration.

In further embodiments, the extractor comprises an electrochemical cell having an ion-permeable membrane between the interior of the container and a gas evolution chamber exteriorly of the chamber, the membrane having a container side disposed in fluid communication with the interior of the container and a chamber side disposed in gaseous communication with the gas evolution chamber, the electrochemical cell on the container side of the membrane operable to cause an oxidization or reduction reaction of the gaseous material in the container resulting in migration of an ionic species across the membrane, and on the chamber side of the membrane operable to regenerate equivalent gaseous material by an opposite reduction or oxidation reaction, whereby the resulting effect is to cause gaseous material to be removed from within the interior of the container and to be regenerated in the chamber. The extractor preferably further comprises a power source for the cell; the initiation means causes the power source be activated to provide electric power to the cell to initiate and maintain the reduction and oxidation; and the cessation means causes the power source to be deactivated and cease providing electric power to the cell, such that the reduction and oxidation are halted. In further preferred embodiments the initiation means and the cessation means comprise electrochemical responses of the power source to respectively the first and second concentrations of the gaseous material within the interior of the container.

Disposed within the container will normally be contents comprising a body of fluid or a solid substance or article. Such contents may, but need not be, subject to physical, chemical or biological degradation in the presence of the gaseous material.

Yet further, in preferred embodiments power source is a battery within the extractor, the battery being such that the extracted gaseous material equivalent is electrochemically stored or consumed by the battery during extraction operation thereof. In cases where the battery is reversible and the gas is not used in battery operation, stored gas may electrochemically discharged from the battery when the battery is operated with an opposite electrical polarity.

In another broad embodiment, the invention is of a method for removing gaseous material from within an enclosed space, which comprises providing a container having an enclosed interior comprising the space and containing the gaseous material; disposing an extractor in fluid contact with the interior of the container; initiating operation of the extractor responsive to a first concentration of the gaseous material in the container, extracting at least a portion of the gaseous material from the interior of the container, and thereafter ceasing operation of the extractor responsive to a second concentration, less than the first concentration, of the gaseous material in the container; and collecting or dispersing extracted gaseous material exteriorly of the interior of the container; whereby that quantity of the gaseous material is removed from the interior of the container which reduces concentration of the gaseous material in the interior of the container from the first concentration to the second concentration.

In preferred embodiments, the method further comprises disposing as the extractor an electrochemical cell having an ion-permeable membrane between the interior of the container and a gas evolution chamber exteriorly of the chamber, the membrane having a container side disposed in fluid communication with the interior of the container and a chamber side disposed in gaseous communication with the gas evolution chamber, and operating the electrochemical cell to effect an oxidization or reduction reaction of the gaseous material in the container on the container side of the membrane, to cause migration of an ionic species across the membrane, and on the chamber side of the membrane to effect an opposite reduction or oxidation reaction to regenerate equivalent gaseous material, whereby the resulting effect is to cause gaseous material to be removed from within the interior of the container and to be regenerated in the chamber, as well as electrochemically causing the initiation means and the cessation means to respond respectively the first and second concentrations of the gaseous material within the interior of the container.

In other preferred embodiments, the extracted gaseous material is electrochemically consumed in the extractor. A preferred manner of accomplishing this is to provide as a power source of the extractor a battery in which electrochemical consumption of the extracted gaseous material occurs in the battery during operation thereof. Alternatively, one may electrochemically retain the extracted gaseous material in the extractor and subsequently electrochemically discharging the stored extracted gaseous material from the battery by operating the battery with an opposite electrical polarity.

As noted, gaseous materials particularly applicable to this invention are oxygen, hydrogen, and the halogen gases, especially chlorine and bromine.

For brevity, the apparatus and electrochemistry of the present invention will be exemplified herein by an electrochemical oxygen extraction module which comprises a power source connected to an electrochemical cell. While this example necessarily defines a particular reduction/oxidation orientation, it will be understood by those skilled in the art that other equivalent devices acting on gases such as hydrogen will have the opposite oxidation/reduction orientation.

The exemplary electrochemical oxygen extraction cell comprises a pair of electrodes on opposite sides of a membrane. An electric current across the membrane results in reduction of oxygen on the cathodic side of the cell and oxidative generation of oxygen from oxygen-containing species (preferably water) on the anodic side of the cell, such that the overall result is the disappearance of free oxygen within the container.

In preferred embodiments, the power source is a battery which generates sufficient energy to operate the electrochemical cell. The battery, when it is of the preferred metal-air type, also can act as a storage means or sink for the reduced oxygen, thereby allowing the oxygen extraction system to be self-contained. The concept of using a metal-air battery as a means to consume the oxygen, as well as being a power source, is novel. The preferred type of battery is a zinc-air battery. The overall apparatus for performing the oxygen extraction and oxygen consumption is sufficiently small to be located within the container or its closure.

The two orientations of oxidation/reduction may be illustrated by comparing A) the extraction of oxygen from a container by use of a zinc-air battery and reduction/oxidation ECM with B) the extraction of hydrogen from a container by use of a nickel-hydrogen battery and oxidation/reduction ECM:

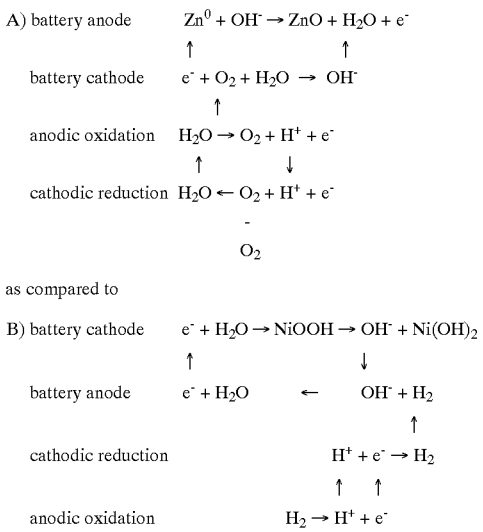

BRIEF DESCRIPTION OF THE DRAWINGS

FIG. 13 (divided into FIGS. 13a, 13b and 13c) illustrates schematically other various arrangements of the container, the extractor and the gas "flow" which are commonly found in the present invention. These arrangements are not limited to the oxygen extraction system exemplified in the previous Figures, but are applicable to removal of many types of gases from closed containers.

DETAILED DESCRIPTION AND PREFERRED EMBODIMENTS

The gas extraction system of the present invention functions to eliminate free, dissolved or reactable gas from within closed containers containing liquid, gaseous or solid contents, which may or may not be gas-sensitive. As a typical example, an oxygen extraction system of this invention can extract oxygen from a container whose contents are oxygen-sensitive pharmaceuticals, biologics, or other materials, compositions or articles. For brevity, in the following detailed description the invention will be discussed in the context of use in a glass-walled container holding an injectable drug contained within a cylindrical glass vial. However, it will be readily apparent to those skilled in the art that this is merely exemplary, and that the device and method described herein may be adapted for use with a variety of contents contained in closed containers, whether those contents are gaseous, liquid or solid, and whether the containers are rigid or flexible. Attention is now directed to the drawings, from which the structure of the device and operation of the method may conveniently be understood.

Figure 1:
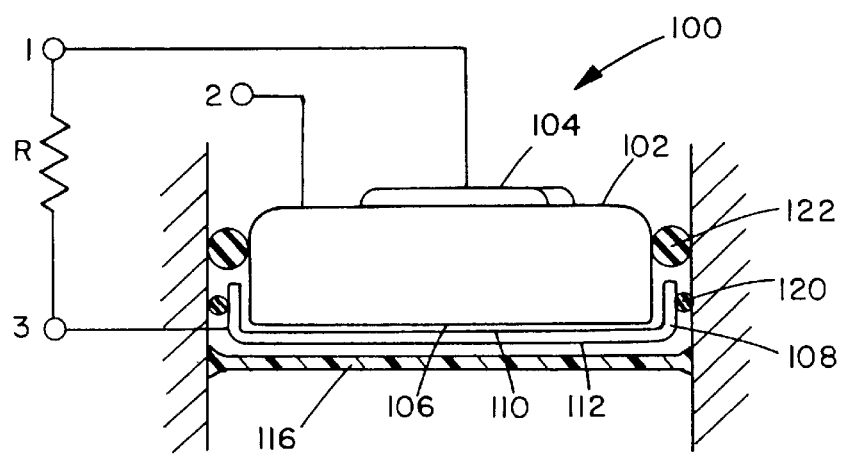
FIG. 1 is a schematic side elevation view, partially in section, showing the principal components of the electrochemical oxygen extractor.
Figure 2A:
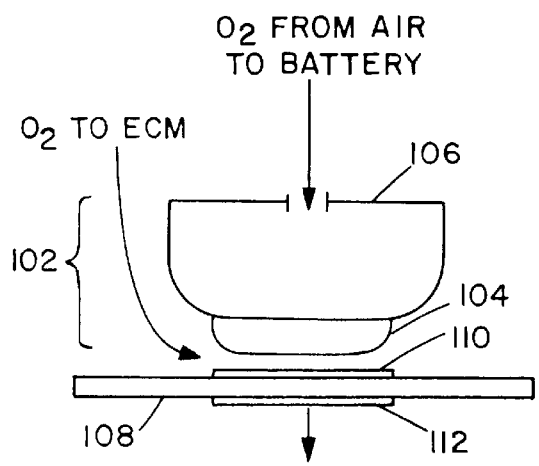
FIG. 2a illustrates the configuration for a prior art zinc-air battery operated with oxygen from air, where the air is supplied simultaneously to the battery and the electrochemical cell.
Figure 2B:
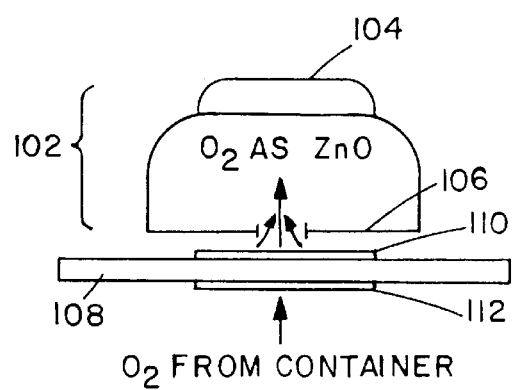
FIG. 2b illustrates the configuration of the present invention for a zinc-air battery extracting oxygen from a container, wherein the oxygen flows solely toward the air intake port of the zinc-air battery.

As shown in FIGS. 1 and 3, the oxygen extraction device 100 includes battery 102 as the power source. In close proximity to battery 102 is electrochemical module (ECM) 108. The battery anode 104 and ECM cathode 112 are connected electrically by resistor 114. FIG. 1 illustrates resistor 114 as being external to casing 118 which surrounds the entire oxygen extraction device 100. Resistor 114, in this case a low resistance wire, provides connection between battery anode 104 and ECM cathode 112. This battery-ECM configuration is different from that described by Maget et al., U.S. Pat. No. 4,902,278 in as much as the air-battery's cathode 106, designed to face air (FIG. 2a), is now facing container gas phase 124 and used for the purpose of providing power, and as a medium to store the extracted oxygen, as illustrated in FIG. 2b.

Figure 3A:
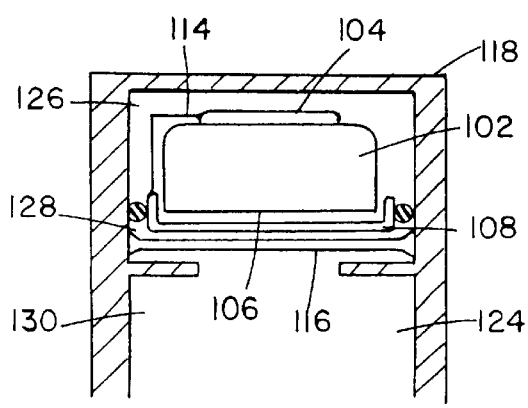
FIG. 3a is a schematic diagram showing the electrochemical oxygen extractor in a closed system configuration.
Figure 3B:
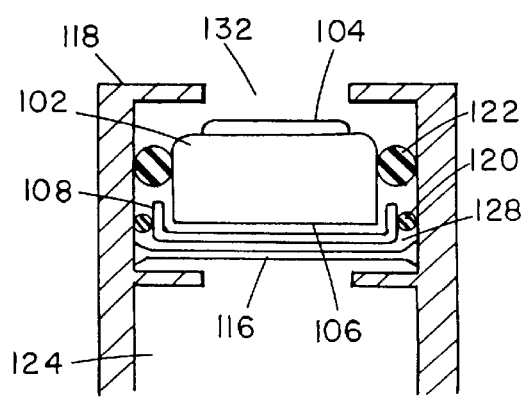
FIG. 3b is an equivalent diagram showing the electrochemical oxygen extractor in an open system configuration.
Figure 4A:
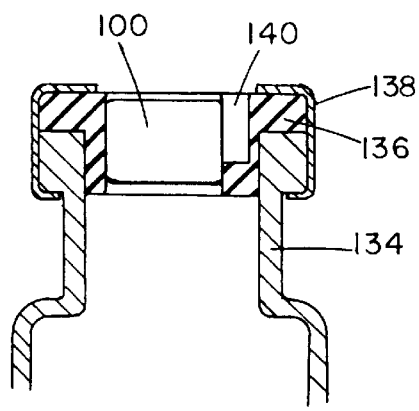
FIG. 4a illustrates a side elevation view of a stopper containing the oxygen extraction device with a needle site offset from the axis of the vial.
Figure 4B:
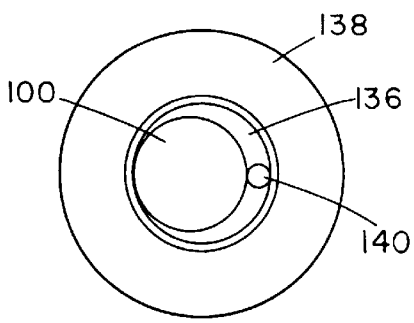
FIG. 4b is a top plan view of the same embodiment.

FIGS. 3a and 3b show the connection between battery 102 and ECM 108 as internal to casing 118. Barrier 116 separates ECM 108 from the drug solution contained within cavity 124 of oxygen-containing vial. In the preferred embodiment, barrier 116 comprises a silicone film. As illustrated in FIG. 3b, seal 120 prevents gas flow between chambers 126 and 130, separated by the silicone barrier 116. Seal 122 prevents gas flow between chambers 126 and 128, separated by ECM 108. Casing 118 houses all of the components of the oxygen extractor system 100 and can be formed from plastic or metal or a combination thereof. The connection between battery cathode 106 and ECM anode 110 is created by pressing the battery 102 against ECM anode 110 current collector.

The preferred embodiment of the present invention is well suited for installation within a vial closure and can be activated before, during or after installation to allow for extraction of oxygen from mixed phases, gases and liquids. In an alternative embodiment, barrier 116 can be integrated with part of the casing by making it from the same material as the casing but with a thinner diffusion area.

In a second alternative embodiment, silicone film barrier 116 can be a sealed pouch surrounding the oxygen extraction system 100. This variation of the embodiment is well suited when the pouch is placed directly into a solution or other liquid and will be further described below. In a third alternative embodiment, shown in FIG. 3b, casing 118 can remain partially open for use in applications in which the oxygen extractor system 100 does not require isolation from the environment. In the presence of air access port 132, secondary seal 122 is required to prevent air from accessing the metal-air battery cathode 106. This embodiment would allow for separate replacement of the battery 102 while the ECM 108 is retained for additional use.

FIGS. 4 through 9 are representative of some of the many alternate configurations of the oxygen extraction device that can be incorporated into the stopper or lid of a container. FIG. 4a illustrates vial 134 whose stopper 136 contains the oxygen extraction device 100 with needle insertion site 140 offset from the axis of the vial. Metal seal 138 secures the oxygen extraction device 100 to vial 134. FIG. 4b shows a top down view of the oxygen extraction device 100 with the offset needle insertion site 140. This vial/stopper configuration is designed so that any interference with the container at the time of extractor insertion or attachment will initiate the device.

Figure 5:
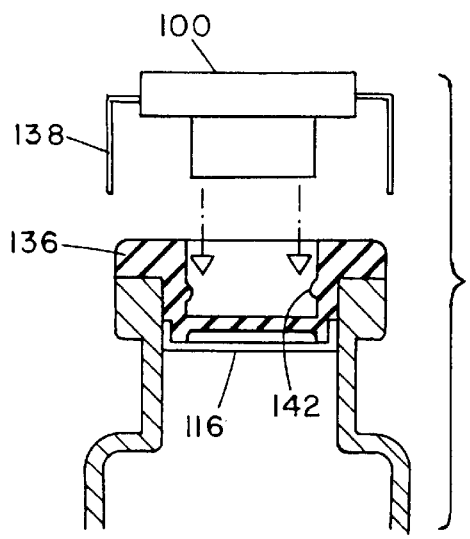
FIG. 5 shows the electrochemical oxygen extractor containable within the cavity of a vial stopper.

FIG. 5 shows how the oxygen extraction device 100 can be incorporated, in an air-tight manner, into a cavity within stopper 136. Silicone membrane 116 attaches to the bottom of stopper 136, below the oxygen extraction device 100, to separate it from the vial contents. Ridges, strategically located inside the cavity of stopper 136 act as additional seals to prevent air access to the vial. In this configuration, the entire stopper/extractor device is removed from the vial before drug retrieval.

Figure 6A:
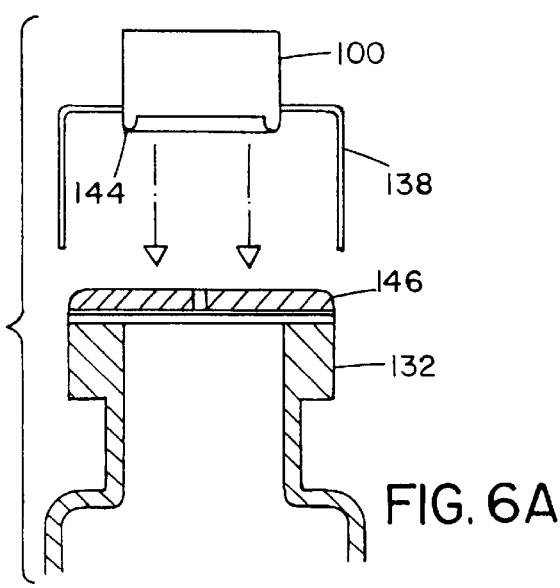
FIG. 6a is a side elevation view of the oxygen extraction device, removable from a laminated disk vial stopper.
Figure 6B:
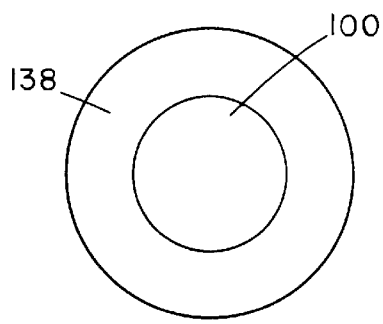
FIG. 6b is a top plan view of the same embodiment.

FIG. 6a illustrates a configuration where the oxygen extraction device 100 can be removed from laminated disk stopper 146 to allow for insertion of a needle into and through laminated disk stopper 146. FIG. 6a shows a cross section of laminated disk stopper 146 placement on vial 134 in conjunction with the removable oxygen extraction device 100. Sealing bumps 144 act as an air barrier when the removable oxygen extraction device 100 is in contact with laminated disk stopper 146. Metal seal band 138 provides a means of connection for the removable oxygen extraction device 100 and laminated disk stopper 146. FIG. 6b is a top down view of the removable oxygen extraction device 100 with metal seal band 138.

Figure 7:
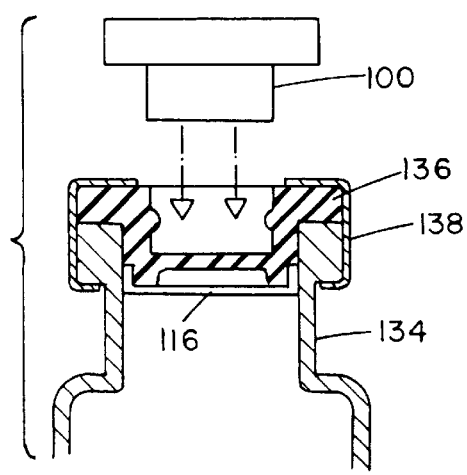
FIG. 7 is a side elevation view illustrating a removable oxygen extraction device, contained within a vial stopper.

FIG. 7 is similar in design with the device described in FIG. 5, however, the design of FIG. 7 allows for the removal of only the oxygen extraction device 100 from the cavity within stopper 136 before needle insertion. Metal seal 138 secures stopper 136 to vial 134 while leaving the oxygen extraction device 100 free for removal and replacement.

Figure 8B:
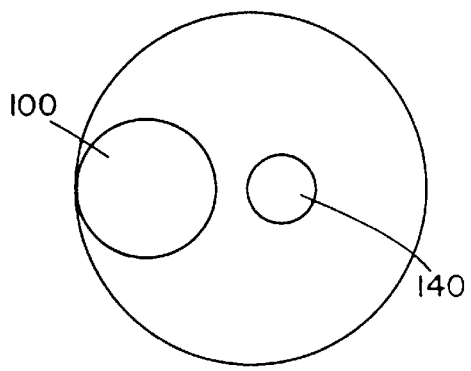
FIG. 8b shows a top plan view of the same device.
Figure 8A:
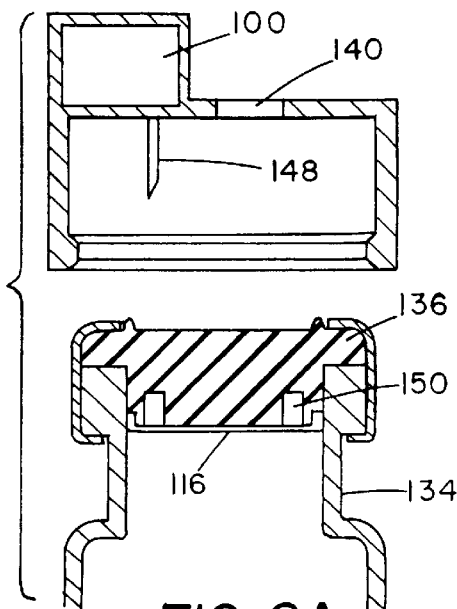
FIG. 8a is a side elevation view of the oxygen extraction device with an added gas space access needle. The vial stopper is designed to accept the extractor with the gas space access needle.

The device of FIG. 8 allows for the addition of the oxygen extraction device 100 to stopper 136 after sterilization of the stopper/vial assembly. The oxygen extraction device 100 has an added gas space access needle 148 which fits into gas space access port 150 of stopper 136. Needle insertion site 140 sits offset from the oxygen extraction device 100 and gas space access needle 148 so that when a needle is inserted through stopper 136, it bypasses the extraction device. FIG. 8b is a top down view of needle insertion site 140 in relation to the oxygen extraction device 100.

Figure 9:
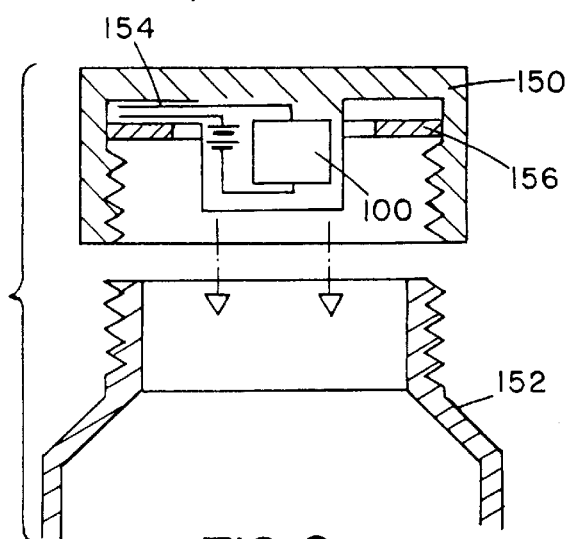
FIG. 9 is a side elevation view of the switch element that activates the oxygen extraction device contained within a screw or push-on cap.

FIG. 9 illustrates how screw or push-on cap 150 can be used to activate the oxygen extraction device 100 contained within. FIG. 9 shows switch element 154 attached to the oxygen extraction device 100 within cap 150. Seal 156 insures that once cap 150 is set in place on container 152 switch element 154 initiates the action of the oxygen extraction device 100.

The individual electrode processes and the flow of oxygen shown in Table 1 illustrates a preferred embodiment of the present invention. As previously stated, the battery anode and the ECM cathode are connected electrically by a resistor. In the preferred embodiment, the battery is a zinc-air button cell battery. The battery is positioned above the ECM so that the battery cathode is in close proximity to and is connected electrically to the ECM anode. The ECM consists of a cation ionomer with two electrodes, either platinum or another active electrocatalyst, assembled with current collectors. Anion ionomers can be substituted provided carbon dioxide is not present in the fluids to be treated.

Table 1 also shows the directional flow of oxygen across the silicone film barrier where it is reduced at the ECM cathode. An equivalent quantity of oxygen is generated at the counter-electrode. This quantity of generated oxygen is reduced cathodically at the battery cathode, transported as a hydroxyl ion to the battery anode, and is consumed in the oxidation of zinc to zinc oxide. The advantage of this approach is the ability to use the zinc-air battery simultaneously as a power supply and an oxygen scavenger as metallic zinc can scavenge considerable amounts (183 cc/mg) of gaseous oxygen.

TABLE 1

Individual Electrode Processes and Directional Flow of oxygen

| | | |
|---|---|---|
| Battery anode | : | $Zn + 2(OH)^- \rightarrow ZnO + H_2O + 2e^-$ ↑ |
| Battery cathode | : | $2(OH)^- \leftarrow \frac{1}{2}O_2 + H_2O + 2e^-$ ↑ |
| ECM anode | : | $H_2O \rightarrow \frac{1}{2}O_2 + 2H^+ + 2e^-$ ↑ |
| ECM cathode | : | $H_2O \leftarrow \frac{1}{2}O_2 + 2H^+ + 2e^-$ ↑ |
| Film | : | $\frac{1}{2}O_2$ ↑ |
| Cavity | : | $\frac{1}{2}O_2 + N_2 + H_2O$ |

An important factor in understanding the function of the oxygen extractor assembly is to understand the relative values of the electrode potentials and the various electrochemical processes which can take place if the assembly is allowed to operate without a method for control.

Metals considered for use in metal-air batteries include lithium, calcium, magnesium, aluminum, zinc and iron. Of the potential metal-air battery candidates, zinc has received the most attention and has been developed for use in small (button-cell) high-capacity primary cells. Therefore, zinc-air batteries are the best choice for inclusion in small holders, such as vial closures. However, for containers with much larger gas volumes, other primary batteries with active metal, such as aluminum-air batteries, are useful. Portable versions of the generally large aluminum-air battery are available with a charge capacity of 300 A-hr. Therefore, larger aluminum-air as well as large zinc-air batteries can be used to extract oxygen from larger containers.

The following model is an example of the procedure for use of the above described device for the extraction of oxygen from a vial:

| | |
|---|---|
| Vial nominal volume: | 38 ml |
| Fluid (drug) volume: | 30 ml |
| Gas headspace: | 8 ml |
| Filling conditions: | airfilled |
| Total contained oxygen volume: | 1.87 cc (inc. dissolved $O_2$) |
| Extraction energy: | 8.1 mA-hr |
| Amount of battery zinc consumed: | 10.2 mg |

In a preferred embodiment of the present invention, a zinc-air battery is selected whose open circuit voltage is approximately 1.4 volts. The extraction energy is calculated from the coulombic equivalence for oxygen which is 0.23 cc $O_2$/mA-hr. The battery energy storage capacity should be in excess of this initial extraction energy as it needs to include the energy required to compensate for oxygen diffusion from the atmosphere back into the container. The energy levels required for these processes are described in the following Table 2.

Various commercial zinc-air batteries are available whose open air voltage is approximately 1.40 volts and whose extraction energy exceeds 8.1 mA-hr. The following Table 2 identifies the characteristics of many existing commercial zinc-air batteries.

TABLE 2

Zinc-Air Battery Options

| Product Number | NEDA/ ANSI Battery # | Rated capacity mA-hr | Approx. max drain mA | Diameter mm | Height mm | Weight grams |
|---|---|---|---|---|---|---|
| 230 | 7005Z | 50–60 | 0.50 | 5.84 | 3.56 | 0.3 |
| 312 | 7002Z | 110–120 | 0.85 | 7.80 | 3.50 | 0.6 |
| 13 | 7000Z | 210–220 | 1.3 | 7.80 | 5.33 | 0.9 |
| 675 | 7003Z | 530 | 2.0 | 11.56 | 5.33 | 1.8 |
| 630 | 7007Z | 1000 | 3.9 | 15.57 | 6.17 | 3.5 |
| 1204 | 7008Z | 6500 | 38.0 | 30.56 | 10.72 | 21.1 |

The capability of these batteries for use in an oxygen extraction system (assuming an extraction energy of 10 mAhr), is illustrated in Table 3.

TABLE 3

Zinc-air battery match for oxygen extractor

| NEDA/ANSI Battery No.[1] | Balance of energy after extraction[2] | Nominal additional battery life available for maintenance[3] |
|---|---|---|
| 7005Z | 40–50 mA-hr | 5.5 months |
| 7002Z | 100–110 mA-hr | 1 year |
| 7000Z | 200–210 mA-hr | 2 years |

[1] A small zinc-air battery is adequate to maintain a drug vial essentially oxygen-free. Larger batteries such as 7007Z and 7008Z would be appropriate for much larger containers.
[2] To remove 1.87 cc of oxygen from the vial
[3] Assuming a maximum leakage current of 10 microamps, which is equivalent to an oxygen intake rate of about 0.05 cc/day. The calculated leakage rate for existing elastomeric stoppers is estimated at 0.01 cc/day, which is equivalent to less than 2 microamps.

A second important battery characteristic is the cathode potential dependency on the oxygen concentration at the cathode. The air cathode is designed to operate in the presence of air. If the air cathode is deprived of oxygen the opportunity for hydrogen evolution exists. To prevent this event, the battery voltage should not be allowed to decrease below 0.3 volts. For example, the battery should not be "shorted" and, at the same time, deprived of oxygen. Given that zinc-air batteries are designed for air operation, a dramatic drop in voltage and the consequent generation of hydrogen, should not be allowed to occur too often or for an extended period of time. However, even upon experiencing repeated low voltage episodes, the zinc-air battery will recover, returning to an operating voltage of 1.35 volts.

The following Table 4 considers the batteries' capability for maintaining a low oxygen level (after nitrogen filling) while remaining in a normal operating voltage range, that is between 0.9–1.4 volts. This is especially important when trying to maintain a low oxygen environment for the oxygen-sensitive drug.

TABLE 4

Zinc-Air Battery Life (for maintenance only)

| NEDA/ANSI Battery # | Nominal battery life to maintain a low oxygen level for two different intake leakage rates | |
|---|---|---|
| | 0.05 cc/day | 0.01 cc/day |
| 7005Z | 0.5 years | 2.5 years |
| 7002Z | 1 year | 5 years |
| 7000Z | 2 years | 10 years |

Table 4 indicates that the battery storage capacity of most button cells is adequate for use in the oxygen extraction system of the current invention. Therefore, battery life rather than storage capacity represents the only limiting factor when choosing which battery to use in the system.

Batteries other than metal-air can be used, although provisions must be made for the storage or evacuation of the extracted oxygen. Silver oxide batteries can be used despite the fact that the oxygen scavenging capability is absent. Because silver oxide batteries display operating voltages in excess of 1.45 volts, an external voltage of 0.1 volt may be required to prevent electrolysis voltages from being reached by the ECM. This may require a resistance of about 5,000 ohms for a 20 microamp steady-state current.

In the case of a battery that does not store or evacuate the extracted oxygen, an open system can be used. In an open system, an oxygen reject port is used to eliminate the extracted oxygen. The secondary seal is not required and the appropriate resistor must be selected to prevent applying voltages in excess of 1.4 volts to the ECM. While an open system facilitates easy access to the battery, background current is increased due to the lack of the secondary seal and the oxygen pressure gradient across the ECM is increased.

The use of a closed system is also an alternative when using a battery other than metal-air. In one variation of a closed system, the extracted oxygen is stored in the chamber above the silicone seal. For an oxygen intake rate of 0.01 cc/day or 3.6 cc/year, the choice would be to either compress the oxygen, by way of the ECM, or insure an adequate chamber volume to accommodate the extracted oxygen.

In a second variation of a closed system, the extracted oxygen is scavenged by absorbent or adsorbent materials located in the anode cavity of the ECM. Scavengers of this type can be either liquids, such as aqueous sulfites, or solids, like activated charcoal.

As previously stated, the electrochemical module or ECM is in close proximity and connected electrically to the zinc-air battery. The ECM has an open circuit voltage of about 0.3–0.4 volts. Therefore, the ECM provides a volt load of 0.3 volts which meets the battery's external load requirement. Because the ECM is "floating" (i.e. it does not depend on fixed potentials but only on voltage differences), electrolysis will not occur unless the ECM voltage exceeds, theoretically 1.23 volts, and in practice 1.45 volts after electrode overvoltages are considered. However, small currents can be observed at voltages of 1.40–1.45 volts. These observable small currents imply that the ECM will operate up to its current limit only when the zinc-air battery is not considerably polarized and the external resistance does not contribute a substantial load to the circuit.

Under the conditions of oxygen extraction, the relationship between the ECM limiting current density ($I_L$) and oxygen partial pressure in the gas phase $P(O_2)$ is:

$$I_L = k'(\text{mA/cm}^2) \times P(O_2)$$

where k' has been determined experimentally at 500 mA/cm² and reported by H. Maget in C. Berger (ed.), HANDBOOK OF FUEL CELL TECHNOLOGY, (Prentice-Hall, 1968).

Taking into consideration that the maximum transient battery current is about 10 mA, the ECM area should be about 0.1 cm², and the limiting current ($I_L$) becomes:

$$I_L = k' \times (\text{Area}) \times P(O_2) \text{ or } I_L = k\ P(O_2) = 50(\text{mA}) \times P(O_2)$$

Also taking into consideration a fixed cavity volume $V_o$ for the vial gas phase, the ECM current will decrease with time (t) in the same manner as the oxygen concentration:

$$I=I_o e^{-Kt}$$

where $I_o$ is the initial limiting current, namely 10 mA, and $K=(0.23\ k/V_o)$ or $0.23\times50/8=1.44$. Therefore, $$I=I_o e^{-1.44t}$$

Table 5 provides the current and oxygen pressure for a 0.1 cm² ECM extracting oxygen from a 8 ml cavity, filled with air, over a period of time.

TABLE 5

Correlation Between Extractor Current and Container Oxygen Pressure (initial gas phase = air)

| Time (hours) | Current (mAmps) | % Oxygen (in gas phase) |
|---|---|---|
| 0 | 10 | 21 |
| 0.5 | 4.9 | 10 |
| 1 | 2.4 | 5 |
| 2 | 0.6 | 1.2 |
| 3 | 0.13 | 0.3 |
| 4 | 0.031 | 0.07 |
| 5 | 0.007 | 0.016 |
| 6 | 0.0018 | 0.0037 |

After 6 hours, the maintenance current is equal to about 2 microamps, and the oxygen concentration about 37 ppm. The current will decrease progressively to that value, depending on the desorption rate of oxygen from the solution. At this point, the maintenance current decreases to a value equivalent to the rate of oxygen intake by the vial (through the stopper) which is estimated at 1–2 microamps.

Once oxygen has been extracted from the vial, a low oxygen environment must be maintained. A similar situation exists when the vial has been originally filled in an inert atmosphere (nitrogen) where the oxygen concentration is as low as 1% rather than the regular 21% found in a full air environment. As can be seen from Table 6, oxygen concentration changes with time, and within 3 hours, the concentration will be below 70 ppm.

TABLE 6

Correlation Between Extractor Current And Container Oxygen Pressure (initial gas phase = 1% $O_2$)

| Time (hours) | Current (mAmps) | % Oxygen (in gas phase) |
|---|---|---|
| 0 | 0.50 | 1 |
| 1 | 0.12 | 0.24 |
| 2 | 0.03 | 0.06 |
| 3 | 0.007 | 0.007 |

Tables 5 and 6 illustrate that even with a small battery, the oxygen concentration within a vial can be reduced to a few parts per million (ppm) in a short time.

Taking into consideration the voltage requirements, and based on known information about commercially available zinc-air batteries, the complete battery/ECM assembly could be less than 1 cm² in diameter and 0.5 cm in height. This would be sufficiently small enough to be incorporated into the stopper of most vials.

In an alternative embodiment, a metal-air battery can be used to scavenge oxygen without the need of an ECM. In this embodiment, a separating film is needed to prevent the drug solution contained in the vial from coming in contact with the battery cathode. When only a metal-air battery is used, a resistor between the anode and cathode must be present to prevent battery voltages in excess of 1.4 V. In the case of a low maintenance current (a few microamps), the resistance needs to be high. The presence of a high resistance implies that the extraction current is limited to small values. For the example illustrated in Table 6, it would take about 2.5 months to evacuate the oxygen to a level of 400 ppm. An embodiment such as this is better suited for use when oxygen concentrations are already very low, i.e. less than 1000 ppm.

Furthermore, in situations where the battery is used without an ECM, care must be taken to ensure that the gas phase environment is substantially depleted of $CO_2$ and/or $SO_2$, as either gas will react with the strong alkaline battery electrolyte resulting in a decrease in battery performance. This process does not occur when an ECM is used since the strongly acidic Nafion ionomer of the ECM works to repel these gases.

In another alternative embodiment an ECM and metal-air batteries are used in a separated configuration rather that the assembled configuration previously described, as in FIG. 1. Electrical connections are the same in both configurations. The separated configuration is not preferred, since while the extractor initially operates efficiently, operation declines rapidly as the oxygen concentration decreases.

Independent of the relationship between the battery and the ECM, means must be provided to isolate the oxygen-sensitive compound, in this case a drug, from contact with the apparatus. As previously mentioned, an oxygen-permeable silicone film is placed adjacent to the ECM cathode, limiting direct exposure of the ECM to the drug. Further, this oxygen-permeable silicone film acts to control the rate of transfer of oxygen within the vial to the ECM cathode. In essence, the silicone film acts as a manual choke. If properly selected, the barrier will limit the rate of oxygen transfer to values compatible with the maximum current acceptable to the battery, thereby protecting the battery.

Silicone films, specifically dimethylsilicone (DMS) films are well suited as a barrier and control of oxygen transfer. With a permeability coefficient of $59\times10^{-9}$ cc-cm/sec-cm²-cm Hg at 25°, it is possible to select appropriate film dimensions compatible with the configuration of the battery/ECM assembly. DMS films are available in thicknesses ranging from 1 to 50 mils. Extremely thin films, 1–2 mils in thickness, are available supported by another thicker high-porosity film or other porous structure.

Since the oxygen transfer across the film barrier is a rate-controlling step, the following relationship can be obtained:

$$(I/I_o)=(P/P_o)=\exp(-K't)$$

where

I and P represent the current and oxygen pressure at time t (hours) and $I_o$ and $P_o$ represent the initial conditions;

$$k'=(P_e)\times(A/t)\times(1/V_o)$$

where $P_e$=permeability coefficient; A=film transfer area, cm²; t=film thickness, cm; and $V_o$=container gas phase volume, cm³.

For example, if $V_o$=8 cc; area=1 cm²; thickness=3 mils: then K'=0.265. The extractor current and oxygen concentration in the vial headspace will vary as illustrated in Table 7.

TABLE 7

Calculated current and oxygen concentration
for a DMS controlled extractor (air start)

| Time (hours) | I (microamps) | Oxygen conc. (%) |
|---|---|---|
| 0 | 1934 | 21 |
| 5 | 514 | 5.6 |
| 10 | 137 | 1.5 |
| 15 | 36 | 0.39 |
| 20 | 10 | 0.10 |
| 24 | 3.3 | 0.04 |

The maximum current of approximately 2 mA is compatible with the battery without causing damage. The oxygen concentration in the vial is reduced to less than 1000 ppm within 20 hours. In a similar example, where the membrane is 1 mil thick as opposed to 3 mils, the same oxygen concentration of 0.04% is achieved in 8 hours.

If the starting conditions are such that the initial oxygen concentration is 1%, as when the vial is filled in an inert gas environment, then the following changes can be calculated.

TABLE 8

Calculated current and oxygen concentration
for a DMS controlled extractor (1% $O_2$ start)

| Time (hours) | I (microamps) | Oxygen conc. (%) |
|---|---|---|
| 0 | 93 | 1 |
| 2 | 54 | 0.59 |
| 5 | 25 | 0.27 |
| 10 | 6.5 | 0.07 |

When starting with an oxygen concentration of 1%, a concentration of 700 ppm will be achieved within 10 hours.

The nature and the geometry of the vial closure can effect the rate of oxygen re-entry into the vial cavity. This oxygen re-entry allows for a concentration gradient to be created between the vial headspace and the outside environment which allows for a residual current through the ECM. The source of the oxygen re-entering the vial headspace can come from within the vial or directly from the outside environment.

Two processes can occur as a result of removing oxygen from a vial. In the first process, once oxygen is removed, a partial vacuum is created within the vial which induces the desorption of oxygen from the drug solution. The second process involves the creation of an oxygen concentration gradient which induces the counter diffusion of oxygen across the ECM and silicone barrier. While these processes involve the movement of oxygen internally within the vial, as a response to oxygen removal, atmospheric oxygen from outside the system can also be diffused or leaked into the vial through the stopper. A combination of these processes can result in a residual current through the ECM. However, appropriate selection of the silicone barrier material can minimize both the internal and external uptake of oxygen, thereby reducing residual current.

All of the previous embodiments have described operating conditions, where properties such as permeability, dimension, and film thickness and area, are used to achieve desirable results. The following alternatives to the embodiment include controls to achieve specific objectives. In this variation, the removal of oxygen is accelerated by increasing the voltage that is applied to the ECM. While the increased voltage level is compatible with hydrogen evolution, the following processes can occur simultaneously: cathodic reduction of oxygen as well as hydrogen evolution; which can result in a chemical reaction between the adsorbed hydrogen on the cathode catalyst with the gas phase oxygen. The combination of these processes increase the rate of removal of oxygen from the gas phase. Therefore, a voltage pulse of 1.45 to 1.5 volts followed by a steady-state applied voltage of 1.23 volts could affect rates of oxygen removal.

In a further alternative, designed to achieve the self-regulation of oxygen removal, a current increase is seen during steady-state operation as a result of increased operating temperature or oxygen leakage. The electronic circuit, sensing the current drift, can trigger a voltage increase which increases the rate of oxygen removal until steady-state operation is re-established. This could be used as a self-regulating feature.

In still another alternative, an oxygen sensor can be used to modulate the applied voltage, in response to internal partial pressure, thereby effecting the rate of oxygen extraction. The ECM can also act as a sensor. The limiting current of the ECM is dependent on the partial pressure of oxygen in the gas phase. The observed current, which is an indication of oxygen concentration, can be correlated with oxygen concentration and is thereby useful in controlling the applied voltage.

As noted, the extractor can also be used for the removal or elimination of gases other than oxygen, such as hydrogen or halogen gases (e.g., chlorine or bromine). Zinc-halogen batteries (Zn—Br or Zn—Cl) can be used for halogen extraction. Metal-hydrogen or metal-metal hydride batteries can be used for hydrogen extraction. Example B of page 13 above illustrates typical electrochemistry of hydrogen extraction.

The following examples provide illustration of applications of the system and method of the present invention.

EXAMPLE 1

Oxygen Extraction From a Cavity

The filling of drug vials designated as containers of oxygen sensitive compounds often must involve the use of cumbersome equipment designed to flood the open containers with nitrogen to displace any atmospheric oxygen before a final seal is put in place. While the vial is generally small in size, the amount of nitrogen needed to sufficiently displace the oxygen is in great excess. Even with the presence of excess amounts of nitrogen, the complete removal of oxygen is inefficient at best. Further, nitrogen filling makes no provision for the inevitable leakage of oxygen through the commonly used elastomeric stopper.

The present invention is designed to remove not only the oxygen present in the vial at the time of filling, but any oxygen that results from leakage through the elastomeric stopper over time. A test was conducted to determine the response of the oxygen extraction device of the present invention for removing oxygen from a small cavity, i.e., a drug vial.

A vial with a cavity volume of 0.71 $cm^3$ was sealed with a stopper containing the oxygen extraction device of the present invention. The power source for the device was a zinc-air battery, model #675 in conjunction with an electrochemical module (ECM). The ECM had an active electrode area of 1 $cm^2$ and the resistor connecting the ECM cathode and battery anode was 100 ohms. For the purposes of this example, a silicone membrane was not employed, however, the experimental values that were derived would not have been effected by the absence or presence of the silicone film.

In order to measure the presence and the amount of oxygen contained within the vial, a Microelectronics, Inc.

MI-730 amperometric electrode oxygen sensor as well as a Microelectronic, Inc. OM-4 oxygen meter with a threshold of 0.1% were utilized. Prior to the start of the experiment, the oxygen meter was calibrated using air and grade 4.8 oxygen-free (less than 20 ppm) nitrogen. The observed results of the experimental example are shown in Table 9 below.

TABLE 9

Oxygen concentration after extraction from a small cavity

| Time (minutes) | Current (mA) | Oxygen Concentration (%) |
|---|---|---|
| 0 | 3.64 | 20.9 |
| 2 | not measured | 16.9 |
| 5 | 3.24 | 11.3 |
| 8 | not measured | 6.3 |
| 10 | 2.65 | 3.4 |
| 12 | not measured | 1.0 |
| 14 | not measured | <0.1 |
| 15 | 0.66 | <0.1 |

EXAMPLE 2

Drug Stability Test

Solutions of the drug Epinephrine are known to be susceptible to oxidative degradation, visible through a progressive coloration from a clear solution to pink salmon, then yellow, and eventually dark brown. A test was conducted using Epinephrine, as a bitartrate, at a concentration of 1.464 grams per liter of solvent water. For the purpose of the experiment, antioxidants or stabilizers, normally present in solutions of Epinephrine, were not added in order to enhance the observed change in coloration of the solution.

The experimental solutions were prepared by using deoxygenated water and then assembling the system under a blanket of nitrogen. The test vials were 38 ml total capacity, filled with 20 ml of the solution, adjusted to pH 4. All tests were conducted at 60° C. The oxygen extraction device included a 4 mil DMS film with an overall area of 1.17 cm$^2$.

The oxygen concentration in the vial's gas phase was measured using a Microelectrodes, Inc. model MI-730 amperometric oxygen probe and a Microelectrodes, Inc. OM-4 oxygen meter. A constant voltage power supply was utilized that provided a voltage of 1.20–1.35 volts. For the purpose of reference, a control solution was prepared in the same manner as the test solutions, but with no oxygen extraction device, and placed adjacently to the test solution in the same environment.

The observed results of the experiment are shown in Table 10 below.

TABLE 10

Stability of Epinephrine

| Time (hours) | Reference Solution | Test Solutions with ECM | ECM current (microamps) | % Oxygen in gas phase |
|---|---|---|---|---|
| 0 | clear | clear | not measured | not measured |
| 16 | pink | clear | 78 | 1.9 |
| 45 | light yellow | clear | 67 | 0.4 |
| 88 | lt. yellow brown | clear | 54 | 0.2 |
| 112 | lt. yellow brown | clear | 54 | <0.1* |
| 135 | golden yellow | clear | 54 | <0.1* |

TABLE 10-continued

Stability of Epinephrine

| Time (hours) | Reference Solution | Test Solutions with ECM | ECM current (microamps) | % Oxygen in gas phase |
|---|---|---|---|---|
| 184 | drk. gold yellow | clear | 54 | <0.1* |
| 264 | drk. gold yellow | clear | 54 | <0.1* |
| 280 | d. amber brwn. | clear | 54 | <0.1* |
| 336 | d. amber brwn. | clear | 54 | <0.1* |
| 425 | d. amber brwn./ oily film | clear | 54 | <0.1* |
| 456 | nearly black/ oily film | clear | 54 | <0.1* |

*Below instrument threshold, i.e., below 0.1%

EXAMPLE 3

Drug Stability Test

Further testing was conducted under similar conditions as described in the previous Example 2, however with the following modifications. A zinc-air battery (Duracell, model 675) was substituted in place of the constant voltage power supply used in Example 2. In addition to changing the power source, the oxygen sensor was not utilized. The following Table 11 illustrates the results obtained from the modified experiment.

TABLE 11

Stability of Epinephrine (using a zinc-air battery as power source)

| Time (hours) | Reference Solution | Test Solutions using ECM | ECM current (microamps) | Zinc-air battery (volts) |
|---|---|---|---|---|
| 0.1 | clear | clear | 608 | 1.391 |
| 69 | pale gray | clear | 40 | 1.386 |
| 136 | brown | clear | 40 | 1.384 |
| 187 | dark brown | clear | 41 | 1.383 |
| 232 | dark brown | clear | 38 | 1.383 |
| 279 | dark brown | clear | 36 | 1.383 |
| 323 | dark brown/ oily film | clear | 37 | 1.382 |

As is evident from the results obtained in Example 3, the zinc-air battery is capable of maintaining a constant voltage that is more than adequate for powering the ECM at an optimal level for the extraction of oxygen. In comparing the ECM current values of Example 3 against the current values seen in Example 2, the ECM/zinc-air battery configuration in Example 3 runs at and maintains a lower current than the ECM/A/C power supply in Example 3.

EXAMPLE 4

The Extraction of Oxygen From Blood in a Plastic Bag

The practical implementation of extracting oxygen from packed red blood cells (PRBC) prior to and during storage for the purpose of extending shelf life is new. Until recently, approaches to red cell preservation have not considered the hemoglobin breakdown damage pathway. Previous attempts at a practical method for blood de-oxygenation failed because they did not address the requirements of modern blood banking techniques.

The design of a practical oxygen extraction device is not trivial. The compatibility requirements for pRBC viability and compatibility with current blood banking techniques and blood bag systems are stringent. Previously suggested methods for the resolution of these problems include 1) chemical consumption of oxygen or 2) gas exchange. The disadvantages of these methods include chemical contamination of the RBCs by chemical byproducts or RBC membrane damage due to handling.

The electrochemical method of the present invention is superior to the previously suggested methods in that there are no harmful byproducts produced to contaminate the blood, and it is non-invasive to the pRBC suspension. In addition the proposed de-oxygenation system is self-regulating which enables continuous extraction of oxygen over time.

The oxygen scavenger of choice is a zinc-air battery. Metal-air batteries use oxygen directly form the environment to produce electrochemical energy. Oxygen diffuses into the cell and is used as the cathode reactant. By electrically shoring the positive and negative terminals of the battery, it may be used to scavenge and store oxygen as opposed to producing energy. The oxygen scavenger operates at the maximum rate compatible with the oxygen pressure to which the cell is exposed. In this application, the battery cathode will consume molecular oxygen that is transferred out of the pRBC suspension and into the pouch.

Figure 10:
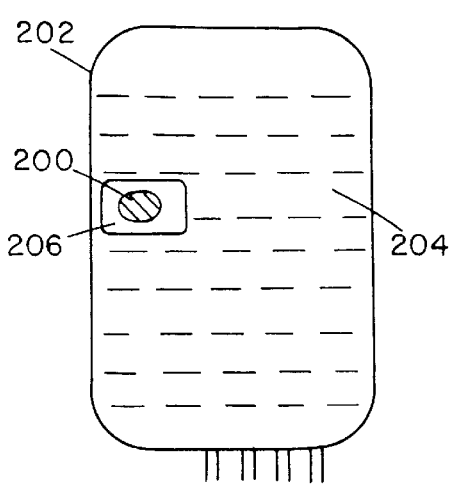
FIG. 10 illustrates a primary blood bag with an enclosed oxygen extraction device.

The oxygen extraction device, capable of consuming oxygen in an irreversible manner, is placed into a blood storage container. FIG. 10 illustrates a primary blood bag with the contained oxygen extraction device. Oxygen extraction device 200 is contained within sealed pouch 206 which has thin film walls permeable to oxygen acts as a barrier to the liquid suspension and contains an oxygen scavenging zinc-air device. Oxygen extraction device 200 is located within primary blood bag 202, surrounded by packed red blood cells (PRBC) 204 in suspension. The oxygen scavenger, once activated, will deplete the oxygen contained within pouch 206 creating a pressure gradient between pRBC suspension 204 and the inside of pouch 206 containing oxygen extraction device 200. The oxygen will permeate through the walls of pouch 206, as driven by the gradient, and be reversibly extracted from pRBC suspension 204. The extraction process will continue until an equilibrium is achieved and will maintain this equilibrium over time.

Figure 11:
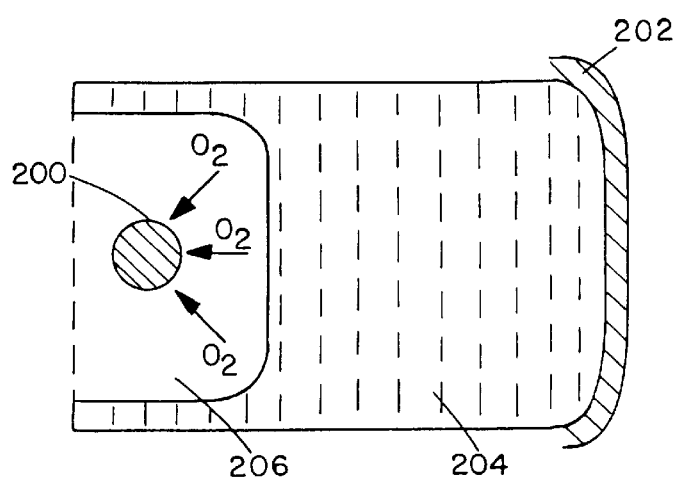
FIG. 11 is a schematic illustrating segregation of the gas and liquid phases when an oxygen extraction system device is located within a blood bag.

Two functions are to be performed: the extraction of oxygen from the blood and the storage of the extracted oxygen. It is important that the oxygen be extracted as quickly as possible and that the oxygen be maintained at a minimum concentration. FIG. 11 is a schematic that illustrates the segregation of the gas and liquid phases when the oxygen extraction device is located within the primary blood bag.

In FIG. 11, packed red blood cell (pRBC) 204 are maintained in a liquid suspension where the partial pressure $P=P(O_2)$ is equivalent to the partial pressure of oxygen contained in pRBC 204 suspension. Primary blood bag 202, containing pRBC 204, shall also be referred to as Film 2 for the purpose of this explanation. Pouch 206, which will also be known as Film 1, encloses the electrochemical oxygen extractor 200 which scavenges oxygen from pRBC 204. As the oxygen from pRBC 204 passes through Film 1 and is drawn to and reduced by the electrochemical oxygen extractor 200, the oxygen contained in the gas phase within Film 1 is depleted. Film 2 is the primary barrier between pRBC 204 and the atmospheric air, where the oxygen partial pressure, $P(O_2)$ is 159 mm Hg.

An expression for the partial pressure of oxygen in the liquid phase, P, as a function of film parameters (f), suspension properties, and time (t) is:

$$P=[15.9/(1+f)]+(P_o-b)e^{-at}$$

where t=time in hours $f=(Pr_2/Pr_1)(A_2/A_1)(\tau_2/\tau_1)$ $a=[Pr_1(A_1/\tau_1)+Pr_2(A_2/\tau_2)]/(S^*V_s)$ $b=(15.9/S^*V_s)Pr_1(A_1/\tau_1)$ A=area of films 1 and 2, in $cm^2$ $\tau$=thickness of films 1 and 2, in mils Pr=Permeability coefficient of films 1 and 2, in cc (STP)-mil/hr-$cm^2$-cm Hg $V_s$=liquid volume, ml $S^*$=solubility of oxygen in liquid cc (STP)/cc-cm Hg $P_o$=159 mm Hg (oxygen pressure in primary blood bag at time=0)

By selecting properties and dimensions of films 1 and 2, the oxygen concentration in the suspension can be determined as a function of time. This simplified model serves to demonstrate several characteristics of the concept. An example of the calculated suspension $P(O_2)$ as a function of time is plotted in FIG. 12 for cases (a), (b), and (c). An example target pressure of 2 mm Hg is attained at 12 hours, 4.8 hours and 2.4 hours for cases (a), (b), and (c) respectively. The magnitude of the pouch area is inversely proportional to the time to reduce the $P(O_2)$ as illustrated by comparing cases (a) and (b). An increase in pouch surface area from 40 to 100 $cm^2$, reduces the time to reach $P(O_2)<2$ mm Hg by a factor of 2.5, i.e., from 12 to 4.8 hours. The thickness of the pouch film is directly proportional to the time to reduce the $P(O_2)$ as illustrated by comparing cases (b) and (c). A decrease in film thickness from 2 to 1 mil, reduces the time to reach the desired partial pressure from 4.8 to 2.4 hours. This comparison illustrates the importance of optimizing the thickness and surface area of the pouch in order to reach the desired oxygen pressure for a reasonable time.

Figure 12:
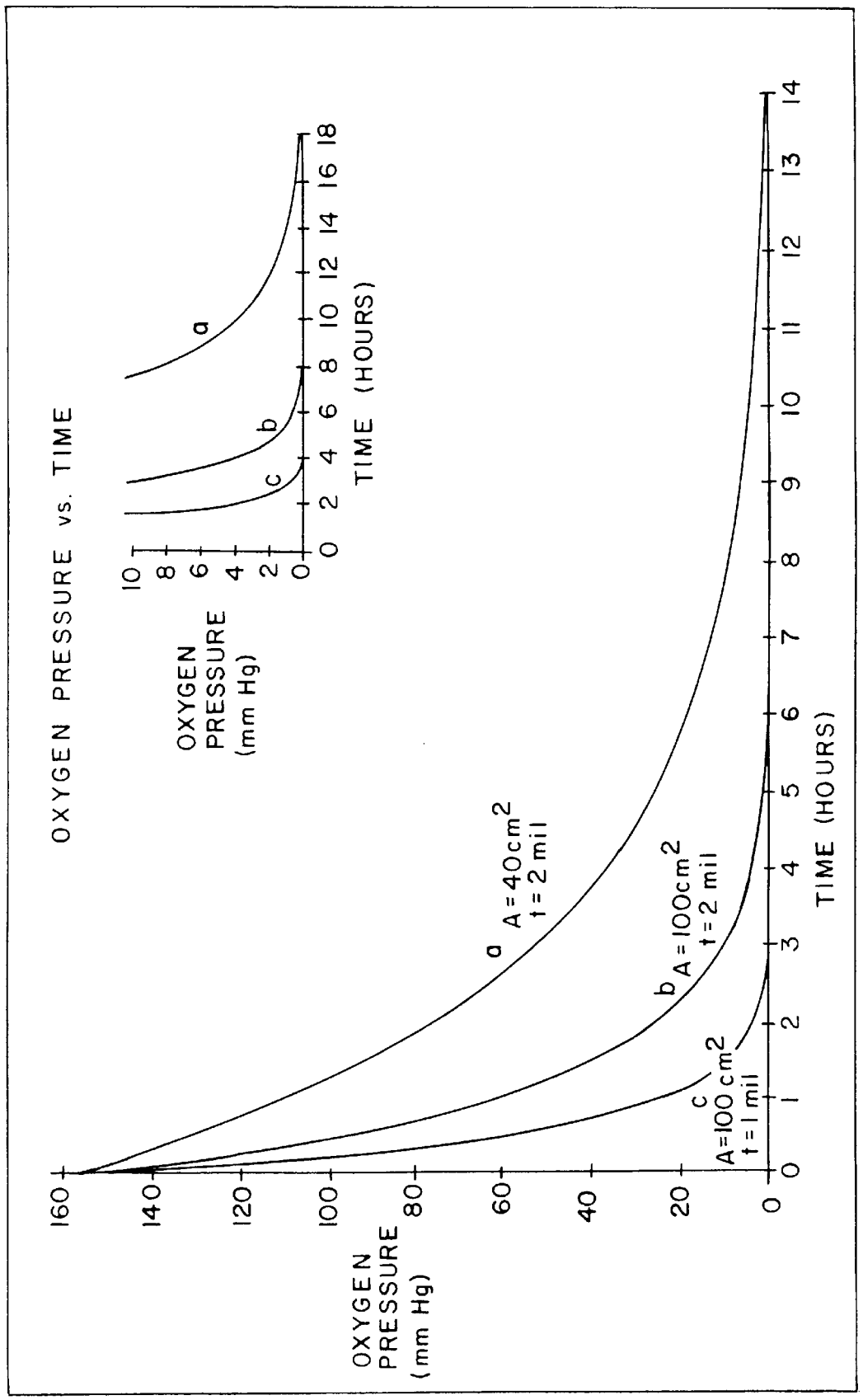
FIG. 12 is a graph showing changes of oxygen pressure over time in three separate situations.

The numerical values in FIG. 12 are based on the following assumptions:

1. The PVC blood bag film is 15 mil thick with a surface area of 350 $cm^2$.
2. The permeability coefficient for oxygen in PVC is $2\times10^{-5}$ cc(STP)-mil/hr-$cm^2$-cm Hg.
3. The pouch has a surface area of 40 $cm^2$ (case a) or 100 $cm^2$ (cases b and c) and is constructed of a silicone film with a thickness of 2 mil (cases a and b) or 1 mil (case c) supported by a hydrophobic porous substrate.
4. The permeability coefficient for oxygen in silicone is 0.0864 cc(STP)-mil/hr-$cm^2$-cm Hg.
5. The liquid volume is 373 ml.
6. The solubility of oxygen in the liquid is constant at 0.126 cc(STP)/cc-cm Hg.
7. The start-up condition inside the pouch is $P(O_2)=0$.
8. The oxygen scavenger consumption rate is equal to the rate of $O_2$ transfer into the pouch.
9. There is no transfer of oxygen from the atmosphere across the PVC bag into the suspension.

In addition to regulating oxygen affinity, the protein structure serves to keep the heme complex in the reduced ($Fe^{II}$) state. The removal of oxygen from the red blood cell solution also keeps the heme complex in the reduced state. This is a crucial function since oxidized species, such as methemoglobin ($Fe^{III}$) and ferrylhemoglobin ($Fe^{IV}$), are 1)

incapable of binding oxygen and 2) capable of oxidative damage to membranes and proteins. The incubation of RBC suspensions at various $P(O_2)$ on the lysis, hemoglobin oxidation, deformability, and crosslinking of membrane proteins has shown that hemoglobin oxidation is a function of oxygen pressure.

FIG. 13 illustrates schematically three additional different arrangements of a container, its contents and an extractor. A container 200 having gas-sensitive contents 202 (here exemplified as a liquid) is closed by cap 204. Contents 202 has incorporated therein a quantity of the gas 206 to be extracted. In FIG. 13a the container 200 is partially filed with the contents 202, with a gas space 208 also present. Gas space 208 is normally filled with an inert gas, although a certain amount of the gas 206 (designated 206') to be extracted will often be dispersed within that inert gas. The extractor 218 is disposed as an integrated unit surrounded by a fluid-impermeable wall 220 and includes the electrochemical cell 212 with the cathode side of the membrane/electrodes 214 in communication with the fluid contents 202 and the battery 216 as the power source. Gas 206 reduced at the cathode side of the membrane/electrodes 214 is regenerated on the anode side and dispersed within the free space 210 of the extractor 218 for use and consumption by the battery 216. As gas 206 is removed from the contents 202 by the extractor 218, the concentration of the gas 206 within the contents 202 decreases, and a proportional amount of the gas 206' becomes absorbed into the fluid contents 202 from which it also can be removed by the extractor 218.

FIG. 13b shows a related embodiment, but in which there is a contents-impermeable wall or partition 222 separating the container contents 202 from a space 224 within the container 200. In this embodiment one can choose whether to have the extractor 218 utilized the extracted gas 206 internally by consumption at the battery 216 or vent the gas into the space 224 where is it out of contact with the contents 202.

FIG. 13c shows yet another related embodiment, in which the space 208 (here designated 208') is filled with the liquid contents 202, so that no free space exists within the container 200. This embodiment also shows a sealed cap 204 which includes an elastomeric insert 226 which can be pierced as by a hypodermic needle (not shown) for extraction of some or all of the contents 202. As with FIG. 13a, the extractor unit 218 in this embodiment is illustrated as self-contained within the contents 202, but the configuration of FIG. 13b could also be used.

It will be evident that there are numerous embodiments which, while clearly within the scope and spirit of the invention, are not expressly set forth above. The above disclosure is therefore intended to be exemplary only, and the actual scope of the invention is to be determined from the appended claims.

We claim:

1. Apparatus for self-limiting removal of gaseous material from within an enclosed space, which comprises:
   a container having an enclosed interior comprising said space and containing said gaseous material;
   an extractor in fluid contact with said interior of said container for extracting at least a portion said gaseous material from said interior of said container and collecting said portion of said gaseous material within said extractor; and
   initiating means operably connected to said extractor and responsive to a first concentration of said gaseous material in said container for initiation of operation of said extractor to extract and collect said portion of said gaseous material and cessation means operably connected to said extractor and responsive to a second concentration, less than said first concentration, of said gaseous material in said container for ceasing operation of said extractor;
   such that operation of said extractor to effect removal of said portion of said gaseous material from said interior of said container reduces concentration of said gaseous material in said interior of said container from said first concentration to said second concentration and transfers removed portion of said gaseous material to said extractor.

2. Apparatus as in claim 1 wherein said extractor comprises an electrochemical cell having an ion-permeable membrane between said interior of said container and a gas evolution chamber exteriorly of said chamber, said membrane having a container side disposed in fluid communication with said interior of said container and a chamber side disposed in gaseous communication with said gas evolution chamber, said electrochemical cell on said container side of said membrane operable to cause an oxidization or reduction reaction of said gaseous material in said container resulting in migration of an ionic species across said membrane, and on said chamber side of said membrane operable to regenerate equivalent gaseous material by an opposite reduction or oxidation reaction, whereby the resulting effect is to cause gaseous material to be removed from within said interior of said container and to be regenerated in said chamber.

3. Apparatus as in claim 2 wherein said extractor further comprises a power source for said cell; said initiation means causes said power source be activated to provide electric power to said cell to initiate and maintain said reduction and oxidation; and said cessation means causes said power source to be deactivated and cease providing electric power to said cell, such that said reduction and oxidation are halted.

4. Apparatus as in claim 2 wherein said container further comprises a sealing closure.

5. Apparatus as in claim 4 wherein said extractor is incorporated into said closure.

6. Apparatus as in claim 1 wherein said initiation means and said cessation means comprise electrochemical responses of said power source to respectively said first and second concentrations of said gaseous material within said interior of said container.

7. Apparatus as in claim 1 wherein said initiating means is further responsive to said first concentration of said gaseous material for initiation of operation of said extractor to consume said gaseous material.

8. Apparatus as in claim 7 further comprising a power source of said extractor comprising a battery which operates by electrochemical consumption of said gaseous material.

9. Apparatus as in claim 1 wherein said initiating means is further responsive to said first concentration of said gaseous material for initiation of operation of said extractor to retain said gaseous material.

10. Apparatus as in claim 9 further comprising a power source of said extractor comprising a battery having means for electrochemically storing said gaseous material following extraction thereof and for electrochemically discharging said gaseous material from said battery when said battery is operated with an opposite electrical polarity.

11. Apparatus as in claim 1 further comprising said container being enclosed by a wall with said extractor being disposed exteriorly of said wall and having fluid communication with said body of fluid through said wall.

12. Apparatus as in claim 1 wherein said container is at least partially enclosed by a wall having two opposite sides and being permeable to said gaseous material, such that said gaseous material may migrate from an ambient atmosphere including said gaseous material on one side of said wall into said interior of said container on the other side of said wall at least in part by infiltration through said wall.

13. Apparatus as in claim 12 further comprising said extractor being disposed within said wall and having fluid communication with interior of said container on one side of said wall and with an interior of said extractor on said other side of said wall.

14. Apparatus as in claim 1 further comprising having disposed within said container, in addition to said gaseous material, contents comprising a body of fluid or a solid substance or article.

15. Apparatus as in claim 14 wherein said body of fluid or said solid substance or article serves at least in part as the source of the presence of said gaseous material within said interior of said container.

16. Apparatus as in claim 14 wherein said contents comprise a body of fluid having incorporated therein said gaseous material.

17. Apparatus as in claim 16 further comprising said extractor being disposed within said body of fluid.

18. Apparatus as in claim 1 wherein said gaseous material comprises oxygen and wherein said extractor comprises an electrochemical cell having an ion-permeable membrane between said interior of said container and a gas evolution chamber exteriorly of said chamber, said membrane having a container side disposed in fluid communication with said interior of said container and a chamber side disposed in gaseous communication with said gas evolution chamber, said electrochemical cell on said container side of said membrane operable to cause a reduction reaction of said oxygen in said container resulting in migration of an ionic species across said membrane, and on said chamber side of said membrane operable to regenerate equivalent oxygen by an opposite oxidation reaction, whereby the resulting effect is to cause oxygen to be removed from within said interior of said container and to be regenerated in said chamber.

19. Apparatus as in claim 18 wherein said extractor further comprises a power source for said cell; said initiation means causes said power source be activated to provide electric power to said cell to initiate and maintain said reduction and oxidation; and said cessation means causes said power source to be deactivated and cease providing electric power to said cell, such that said reduction and oxidation are halted.

20. Apparatus as in claim 18 wherein said initiating means is further responsive to said first concentration of said gaseous material for initiation of operation of said extractor to consume said oxygen.

21. Apparatus as in claim 20 further comprising a power source of said extractor comprising a battery which operates by electrochemical consumption of said oxygen.

22. Apparatus as in claim 21 wherein said battery comprises a metal-air battery.

23. Apparatus as in claim 18 wherein said initiating means is further responsive to said first concentration of said gaseous material for initiation of operation of said extractor to retain said oxygen.

24. Apparatus as in claim 23 further comprising a power source of said extractor comprising a battery having means for electrochemically storing said oxygen following extraction thereof and for electrochemically discharging said oxygen from said battery when said battery is operated with an opposite electrical polarity.

25. Apparatus as in claim 18 further comprising having disposed within said container contents comprising a body of fluid or a solid substance or article which is subject to physical, chemical or biological degradation in the presence of said oxygen.

26. Apparatus as in claim 25 wherein said contents comprises an oxygen sensitive pharmaceutical, biocompound, blood, blood product, cosmetic formulation, electric or electronic component or device.

27. Apparatus as in claim 26 wherein said metal-air battery comprises a zinc-air battery.

28. Apparatus as in claim 18 wherein said container is at least partially enclosed by a wall having two opposite sides and being permeable to said gaseous material, such that said oxygen may migrate from an ambient atmosphere including said oxygen on one side of said wall into said interior of said container on the other side of said wall at least in part by infiltration through said wall.

29. Apparatus as in claim 28 further comprising said extractor being disposed within said wall and having fluid communication with interior of said container on one side of said wall and with an interior of said extractor on said other side of said wall.

30. Apparatus as in claim 18 further comprising said container being enclosed by a wall with said extractor being disposed exteriorly of said wall and having fluid communication with said body of fluid through said wall.

31. Apparatus as in claim 18 further comprising having disposed within said container, in addition to said oxygen, contents comprising a body of fluid or a solid substance or article.

32. Apparatus as in claim 31 wherein said body of fluid or said solid substance or article serves at least in part as the source of the presence of said oxygen within said interior of said container.

33. Apparatus as in claim 31 wherein said contents comprise a body of fluid having incorporated therein said oxygen.

34. Apparatus as in claim 33 further comprising said extractor being disposed within said body of fluid.

35. Apparatus as in claim 1 wherein said gaseous material comprises hydrogen and wherein said extractor comprises an electrochemical cell having an ion-permeable membrane between said interior of said container and a gas evolution chamber exteriorly of said chamber, said membrane having a container side disposed in fluid communication with said interior of said container and a chamber side disposed in gaseous communication with said gas evolution chamber, said electrochemical cell on said container side of said membrane operable to cause an oxidation reaction of said hydrogen in said container resulting in migration of an ionic species across said membrane, and on said chamber side of said membrane operable to regenerate equivalent hydrogen by an opposite reduction reaction, whereby the resulting effect is to cause hydrogen to be removed from within said interior of said container and to be regenerated in said chamber.

36. Apparatus as in claim 35 further comprising a metal-hydrogen or metal-metal hydride battery as a power source of said electrochemical cell.

37. Apparatus as in claim 1 wherein said gaseous material comprises a halogen gas and wherein said extractor comprises an electrochemical cell having an ion-permeable membrane between said interior of said container and a gas evolution chamber exteriorly of said chamber, said membrane having a container side disposed in fluid communication with said interior of said container and a chamber side disposed in gaseous communication with said gas evolution chamber, said electrochemical cell on said container side of said membrane operable to cause an oxidation reaction of said halogen gas in said container resulting in migration of an ionic species across said membrane, and on said chamber side of said membrane operable to regenerate equivalent halogen gas by an opposite reduction reaction, whereby the resulting effect is to cause halogen gas to be removed from within said interior of said container and to be regenerated in said chamber.

38. A method for self-limiting removal of gaseous material from within an enclosed space, which comprises:
   providing a container having an enclosed interior comprising said space and containing said gaseous material;
   disposing an extractor in fluid contact with said interior of said container;
   initiating operation of said extractor responsive to a first concentration of said gaseous material in said container, extracting at least a portion of said gaseous material from said interior of said container, and thereafter ceasing operation of said extractor responsive to a second concentration, less than said first concentration, of said gaseous material in said container; and collecting extracted gaseous material within said extractor;
   whereby said portion of said gaseous material is removed from said interior of said container, thereby reducing concentration of said gaseous material in said interior of said container from said first concentration to said second concentration, and is transferred to said extractor.

39. A method as in claim 38 further comprising disposing as said extractor an electrochemical cell having an ion-permeable membrane between said interior of said container and a gas evolution chamber exteriorly of said chamber, said membrane having a container side disposed in fluid communication with said interior of said container and a chamber side disposed in gaseous communication with said gas evolution chamber, and operating said electrochemical cell to effect an oxidization or reduction reaction of said gaseous material in said container on said container side of said membrane, to cause migration of an ionic species across said membrane, and on said chamber side of said membrane to effect an opposite reduction or oxidation reaction to regenerate equivalent gaseous material, whereby the resulting effect is to cause gaseous material to be removed from within said interior of said container and to be regenerated in said chamber.

40. A method as in claim 39 wherein said gaseous material comprises a halogen gas and wherein operation of said extractor effects a reduction reaction of said halogen gas on said container side and regeneration of equivalent halogen gas by an opposite oxidation reaction on said chamber side, whereby the resulting effect is to cause halogen gas to be removed from within said interior of said container and to be regenerated in said chamber.

41. A method as in claim 39 further comprising electrochemically causing said initiation means and said cessation means to respond respectively said first and second concentrations of said gaseous material within said interior of said container.

42. A method as in claim 39 wherein said gaseous material comprises oxygen and wherein operation of said extractor effects a reduction reaction of said oxygen on said container side and regeneration of equivalent oxygen by an opposite oxidation reaction on said chamber side, whereby the resulting effect is to cause oxygen to be removed from within said interior of said container and to be regenerated in said chamber.

43. A method as in claim 42 wherein said extracted oxygen is consumed in said extractor.

44. A method as in claim 43 further comprising providing as a power source of said extractor a battery in which said extracted oxygen is electrochemically consumed by said battery during operation thereof.

45. A method as in claim 44 wherein said battery comprises a metal-air battery.

46. A method as in claim 45 wherein said metal-air battery comprises a zinc-air battery.

47. A method as in claim 42 further comprising disposing within said container contents comprising a body of fluid or a solid substance or article which is subject to physical, chemical or biological degradation in the presence of said oxygen.

48. A method as in claim 47 wherein said contents comprises an oxygen sensitive pharmaceutical, biocompound, blood, blood product, cosmetic formulation, electric or electronic component or device.

49. A method as in claim 39 wherein said gaseous material comprises hydrogen and wherein operation of said extractor effects an oxidation reaction of said hydrogen on said container side and regeneration of equivalent hydrogen by an opposite reduction reaction on said chamber side, whereby the resulting effect is to cause hydrogen to be removed from within said interior of said container and to be regenerated in said chamber.

50. A method as in claim 49 wherein said extracted hydrogen is consumed in said extractor.

51. A method as in claim 50 further comprising providing as a power source of said extractor a battery in which said extracted hydrogen is electrochemically consumed by said battery during operation thereof.

52. A method as in claim 51 wherein said battery comprises a metal-hydrogen or metal-metal hydride battery.

53. A method as in claim 49 further comprising said containing having a wall which is permeable to said oxygen and said oxygen entering said container at least in part by infiltation through said permeable wall.

54. A method as in claim 38 further comprising said containing having a wall which is permeable to said gaseous material and said gaseous material entering said container at least in part by infiltation through said permeable wall.

55. A method as in claim 38 further comprising electrochemically consuming said extracted gaseous material in said extractor.

56. A method as in claim 55 further comprising providing as a power source of said extractor a battery, and wherein electrochemical consumption of said extracted gaseous material occurs in said battery during operation thereof.

57. A method as in claim 38 further comprising electrochemically retaining said extracted gaseous material in said extractor.

58. A method as in claim 57 further comprising providing as a power source of said extractor a battery, and wherein electrochemical retention of said extracted gaseous material stored following extraction thereof occurs in said battery, and further comprising subsequently electrochemically discharging said stored extracted gaseous material from said battery by operating said battery with an opposite electrical polarity.

59. A method as in claim 38 further comprising disposing within said container, in addition to said gaseous material, contents comprising a body of fluid or a solid substance or article.

60. A method as in claim 59 wherein said contents comprise a body of fluid having incorporated therein said gaseous material.

* * * * *